(12) United States Patent
Bowman (10) Patent No.: US 12,355,312 B2
(45) Date of Patent: Jul. 8, 2025

(54) ROTOR POSITION SENSOR SYSTEM FOR A SLOTLESS MOTOR

(71) Applicant: ETA Green Power Limited, Hethel (GB)

(72) Inventor: Liam Bowman, Hethel (GB)

(73) Assignee: ETA Green Power Limited (GB)

( * ) Notice: Subject to any disclaimer, the term of this patent is extended or adjusted under 35 U.S.C. 154(b) by 255 days.

(21) Appl. No.: 18/082,760

(22) Filed: Dec. 16, 2022

(65) Prior Publication Data

US 2023/0198344 A1     Jun. 22, 2023

(30) Foreign Application Priority Data

Dec. 17, 2021   (GB) ..................................... 2118458

(51) Int. Cl.

| | |
|---|---|
| *H02K 11/21* | (2016.01) |
| *G01D 5/14* | (2006.01) |
| *H02K 3/34* | (2006.01) |
| *H02K 3/47* | (2006.01) |
| *H02K 5/06* | (2006.01) |

(52) U.S. Cl.
CPC ............. *H02K 11/21* (2016.01); *G01D 5/14* (2013.01); *H02K 5/06* (2013.01); *H02K 2213/03* (2013.01)

(58) Field of Classification Search
CPC . H02K 11/21; H02K 3/34; H02K 3/47; G01D 5/14; G01D 5/142
USPC ....................................................... 310/68 B
See application file for complete search history.

(56) References Cited

U.S. PATENT DOCUMENTS

| | | | |
|---|---|---|---|
| 4,847,527 A | | 7/1989 | Dohogne |
| 5,325,005 A | * | 6/1994 | Denk ...................... H02K 29/08 |
| | | | 310/68 B |
| 5,591,019 A | | 1/1997 | Brown |
| 5,619,085 A | | 4/1997 | Shramo |
| 5,654,599 A | * | 8/1997 | Casper ................... H02K 29/08 |
| | | | 310/68 B |
| 5,710,474 A | * | 1/1998 | Mulgrave ............... H02K 29/08 |
| | | | 310/85 |
| 5,877,568 A | * | 3/1999 | Maes ...................... H02K 29/10 |
| | | | 310/68 B |

(Continued)

FOREIGN PATENT DOCUMENTS

JP          2005151719 A       6/2005

OTHER PUBLICATIONS

Combined Search and Examination Report for Application No. GB2118458.5, dated Jan. 31, 2022, 11 pages.

(Continued)

*Primary Examiner* — Burton S Mullins
(74) *Attorney, Agent, or Firm* — Barnes & Thornburg (57) ABSTRACT

The present invention relates to a slotless motor comprising a rotor position sensing element. The motor has a rotor having a rotational axis and a plurality of coil windings arranged into an integer N number of distinct blocks, each block being arranged about the rotational axis and having a gap between each adjacent pair of blocks. The rotor position element has a sensor ring having a sensor fixed to the sensor ring and a sensor ring attachment extending from the sensor ring wherein the sensors are spaced around the rotational axis and wherein the rotor position sensing element is configured to hold the sensor ring relative to at least one of the blocks such that the sensor is held in a predetermined position.

16 Claims, 6 Drawing Sheets

(56) References Cited

U.S. PATENT DOCUMENTS

| | | | |
|---|---|---|---|
| 7,263,905 B2 * | 9/2007 | Seffernick | H02K 29/08 |
| | | | 310/260 |
| 8,375,561 B2 * | 2/2013 | Yan | H02K 11/225 |
| | | | 310/40 MM |
| 8,803,398 B2 * | 8/2014 | Takeuchi | H02K 15/12 |
| | | | 310/180 |
| 9,461,515 B2 * | 10/2016 | Furukawa | H02K 3/487 |
| 2010/0109458 A1 | 5/2010 | Hauser et al. | |
| 2012/0274167 A1 * | 11/2012 | Kim | H02K 3/522 |
| | | | 310/156.08 |
| 2021/0067009 A1 | 3/2021 | Liu et al. | |

OTHER PUBLICATIONS

Extended European Search Report for Application No. 22213768.9-1202, dated May 22, 2023, 9 pages.

* cited by examiner

ROTOR POSITION SENSOR SYSTEM FOR A SLOTLESS MOTOR

CROSS REFERENCE TO RELATED APPLICATIONS

This application claims priority to and the benefit of GB Patent Application No. 2118458.5 dated 17 Dec. 2021, the disclosure of which is now expressly incorporated herein by reference.

FIELD OF THE INVENTION

The present invention relates to a slotless motor with improved rotor positioning. More particularly, but not exclusively, the present invention relates to a rotor position sensing element for a slotless motor.

BACKGROUND OF THE INVENTION

It is well known that the position of the rotor, a moveable part of a motor, relative to the stator, a stationary part of a motor, plays a fundamental role in the function of a motor. The precise and accurate positioning of a rotor is required to ensure that the motor functions efficiently during start up and through its full Revolutions Per Minute (RPM) range.

Many variations of different motor configurations are known, the majority of which fall into two categories: slotted motors and slotless motors. Both configurations have a stator comprising coil windings and a rotor, all of which is comprised within a motor housing. The stator, typically made of steel laminations, is arranged to encompass the rotor, the rotor comprising permanent magnets and being configured to rotate about its rotational axis. The coil windings, typically made of copper, are wound in the air gap between the rotor and stator. The coil windings typically comprise a number of electromagnetic phases where each phase is energized through current outputs from a motor controller.

In slotted motors, the stator is placed around the rotor and made of slotted laminations that are stacked together where the motor coil windings are inserted into these slots (sometimes referred to as "teeth"). In a slotless motor, the stator is placed around the rotor but there are no slotted laminations, and the motor coil windings are wound around the rotor and arranged in the air gap between the rotor and stator.

In the slotless motor, the phases of the coil windings are wound such that each phase is repeated around the rotor with a rotational symmetry wherein a particular phase is separated from the subsequent phase winding of the particular phase, by the other phases. For example, in the case when there are three phases: A, B and C, the repeated phase winding pattern would be ABC, ABC, ABC etc. This pattern is spaced around the rotor such that the order that each phase winding is energised generates a torque in the rotor due to the interaction between the magnetic field generated in the coils and the permanent magnets on the rotor. In order for this to work it is necessary for the precise position of the rotor relative to the stator windings to be known so as to energise the appropriate phase at the appropriate point during the rotation of the rotor, even when the rotor is stationary. This interaction controls the direction and speed the rotor spins at and is fundamental to motor control. Although this interaction has been described in terms of a rotor comprising permanent magnets, it would be understood that a torque is generated in a similar manner with other types of rotors, for example, a rotor for a reluctance motor.

In a slotted motor the rotor position sensor is usually located on or in between the stator "teeth", whereas, providing a sensor for a slotless motor may present more of a challenge because of the lack of stator teeth. The reason for this is that the rotor position sensor has to be placed in a manner such that its fixed relative to the rotor and stator windings in order to provide an accurate reading. In either case, the tolerances of measurements of the stator, rotor and motor housing relative to one and other is vital to providing a high precision, accurate rotor position readings.

The present invention seeks to solve the above-mentioned problems.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In accordance with a first aspect of the invention, there is provided a slotless motor comprising:
  a rotor having a rotational axis;
  a plurality of coil windings arranged into an integer N number of distinct blocks, each block being arranged about the rotational axis and having a gap between each adjacent pair of blocks; and
  a rotor position sensing element comprising:
  a sensor ring having a sensor fixed to the sensor ring; and
  a sensor ring attachment extending from the sensor ring;
  wherein the sensors are spaced around the rotational axis; and
  wherein the rotor position sensing element is configured to hold the sensor ring relative to at least one of the blocks such that the sensor is held in a predetermined position.

The plurality of coil windings is arranged into blocks, for example each of the blocks of the plurality of coil windings has a gap between the adjacent blocks, such that when a current is applied to a particular block it becomes electromagnetically energised and generates a torque within the rotor causing it to rotate towards the said energised block. This torque may be generated by an interaction between the magnetic field of the blocks and either the magnetic field of a permanent magnet rotor, or the reluctance of the reluctance rotor. By holding the rotor position sensing element relative to a particular block of coil windings, the sensor ring is held fixed relative to the rotor and is able to provide a reference point for the present positioning of the rotor relative to the block of coil windings. For example, the positioning of the rotor may be given as an angle of rotation of a particular point on the rotor away from said reference block. In some examples, the sensor ring attachment is configured to couple to one of the gaps between the adjacent blocks. Once the position of the rotor relative to a reference block of coil winding is known it is possible to work out which block should be energised in order to generate the required torque in the rotor in order to get the rotor to rotate.

In some examples, the motor further comprises a motor housing, wherein the housing may hold the coil windings in a fixed location relative to the housing. In some examples, the motor housing is formed from a composite material, for example comprising a metallic material, and in some examples, the housing is metallic. In some examples, the sensor ring may be coupled to the motor housing. The rotor position sensing element is held relative to the coil blocks and the motor housing. The motor housing may comprise a proximal end cap and a distal end cap and the sensor ring may be coupled to one of the end caps. For example, the sensor ring may have a nodule that only allows it to be coupled to the motor housing in a predetermined orientation.

In some examples, the sensor ring may be integrally formed with the motor housing. For example, the sensor ring may be integrally formed with an end cap of the motor housing. This may be achieved by, for example, casting the motor housing and the sensor ring as a single piece. In some examples, this is achieved though welding, gluing or some other manner of fusing the sensor ring to the motor housing. In some examples, the sensor ring attachments may be integrally formed with the motor housing and the sensor ring is couplable to the motor housing. Coupling the sensor ring and/or sensor ring attachments to the motor housing means that the sensor on the sensor ring is aligned with the motor housing as well as the stator and held fixed relative to the rotor.

In accordance with a second aspect of the invention, there is provided a rotor position sensing element for a slotless motor comprising a rotor having a rotational axis and a plurality of coil windings wherein the coil windings are arranged into N distinct blocks of coil windings having a gap between each pair of adjacent blocks, the rotor position sensing element comprising:
  a sensor ring comprising at least one sensor fixed to the sensor ring and configured to be spaced around the rotational axis; and
  a sensor ring attachment extending from the sensor ring and configured to hold the sensor ring relative to at least one of the blocks such that the sensor(s) is/are held in position relative to the blocks.

In some examples, the sensor is any one of: a magnetic field sensor, for example a hall-effect based position sensor or a magnetostrictive position sensor, a potentiometric position sensor, an inductive position sensor, an eddy current-based position sensor, a capacitive position sensor, a fibre-optic position sensor, an optical position sensor and an ultrasonic position sensor.

In some examples, the rotor position sensing element comprises a plurality of sensors. For example, the plurality of sensors is angularly spaced apart around the rotational axis based on one or more of the numbers of distinct blocks and/or a number of phases of the coil windings. In doing so it is possible to identify which of the equivalent coil location is the closest to a particular point on the rotor. The term "equivalent coil location", refers to the direction of the induced magnetic field in the coil windings and, in the case of the windings having a plurality of phases, a corresponding phase or a corresponding phase and direction of the induced magnetic field in the coil windings i.e. a coil winding of a particular phase in a block has an equivalent coil location to a coil winding driven in the same phase in a different block, although the direction of induced magnetic field may or may not be different.

In some examples, the sensor ring and the sensor ring attachment are integrally formed.

In some examples, each distinct block includes a positive integer number X of phases of coil windings. Preferably each block comprises three phases of coil windings. For example, wherein an angular position of largest flux magnitude for each winding is spaced apart from angular positions of largest flux magnitude of adjacent windings by an angle of $\pi/NX$ radians, where N is the number of distinct blocks and X is the number of phases in a block. This spacing corresponds to the maximum flux, and strongest point in the magnetic field, generated by current passing through a particular phase of the coil windings at different angular locations irrespective of the direction of the induced magnetic field.

Note that in some examples where the blocks are substantially identical to one another, the angular spacing between blocks (e.g. the same point on each block, such as the centre-centre distance of two adjacent blocks) is $2\pi/N$ radians, where N is the total number of blocks. This is consistent with the $\pi/NX$ radian spacing between equivalent blocks because there are also two directions of induced magnetic field, P, related to windings wound in a first and second direction, which any given block can have. With this taken into account, the "full" expression for the angle of rotation to arrive at an equivalent block is therefore $2\pi/NPX$, where P≡2, thereby arriving at the $\pi/NX$ expression above.

In some examples, each coil winding in each block comprises a repeated winding pattern such that each phase winding is wound in a first direction and consecutively wound in a second direction opposite to the first direction. In some examples, each block would have an X phase pattern in a first direction followed by an X phase pattern in a second direction opposite to the first i.e. ($A_\uparrow$, $B_\uparrow$, $C_\uparrow$, $A_\downarrow$, $B_\downarrow$, $C_\downarrow$) is one winding pattern etc., in which A, B and C represent distinct phases and the arrows ($\uparrow$ and $\downarrow$) represent the direction of the induced magnetic field in the coil winding. Note that the direction of the arrows is arbitrary, merely indicating that two given coils are arranged to have the same direction of induced magnetic field as one another when their arrows are the same and opposite direction of induced magnetic field when their arrows are opposed. Thus in the above example pattern, $A_\uparrow$ and $A_\downarrow$ share a phase but when they are energised their magnetic field points in opposite directions. This can be thought of as being 180 degrees out of phase with one another when sinusoidally varying currents are applied.

In some examples, the N number of distinct blocks have an N-fold rotational symmetry about the rotational axis such that equivalent locations in each block are spaced apart by $2\pi/N$ radians. In other words, each block has an identical configuration evenly spaced about the rotational axis such that, from any given starting point, rotations of an angle calculated as any positive integer multiplied by $2\pi/N$ radians leads to an equivalent coil location.

In some examples, the plurality of sensors is spaced apart from each other by an angle, in radians, of:

$$n\left(\frac{2\pi}{N}\right) + m\left(\frac{2\pi}{N \cdot X}\right)$$

wherein n is any integer and m is any integer except 0 or pX and in which p is any integer. This points to any location around the coil winding's rotational symmetry either in the clockwise direction i.e. positive integers values for p or the counter clockwise direction i.e. negative integer values for p.

In some examples, the plurality of sensors is spaced apart from each other by an angle, in radians, of:

$$n\left(\frac{2\pi}{N}\right) + m\left(\frac{\pi}{N \cdot X}\right)$$

wherein n is any integer and m is any integer except 0 or 2pX and in which p is any integer. This equation refers to any location around the coil winding's rotational symmetry at a particular phase and direction of induced magnetic field. In some examples, there is a further asymmetric shift applied to some of the sensor spacing, δ, which ensures that some sensors are placed offset from equivalent coil locations, even when all the coils are evenly spaced about a rotational symmetry. This provides information on the current rotor position relative to the coils, for example the point of largest flux of a particular phase and direction of coil winding (e.g. sensors that are not offset), as well as information about how offset a particular point on the rotor is relative to the next coil winding, for example the next largest flux magnitude at a particular direction of coil winding of a phase. In some examples, in addition to the above equation some or all the sensors are asymmetrically offset by some factor, δ. The asymmetric offset factor, δ, may be different for different pairs of sensors to gain further and more nuanced information in accordance with the general principles of asymmetric offsets discussed above.

In some examples, the sensor ring attachment is configured to couple to the gap between adjacent blocks.

In some examples, an end of the sensor ring attachment is configured to be held in the gap between adjacent blocks.

In some examples, the rotor position sensing element comprises a plurality of sensor ring attachments each configured to couple to a different gap between adjacent blocks In some examples, at least one of the plurality of sensors is held in a fixed position relative to the sensor ring attachment(s).

In some examples, the sensor ring attachment(s) is/are formed as a tapering projection. For example, the tapering projection is shaped to match the shape of a gap between adjacent block of coil windings.

DRAWINGS

Embodiments of the disclosure will now be described, by way of example only, with reference to the accompanying drawings, in which.

DETAILED DESCRIPTION

Embodiments of the claims relate to a slotless motor with a precise rotor positioning measuring system. In particular, embodiments of the claims relate to a rotor position sensing element comprising a sensor ring and a sensor ring attachment that holds the sensor ring fixed relative to the coil windings that may be used, for example, in a slotless motor comprising a stator comprising coil windings and a rotor comprising permanent magnets. As a result, the system can help to provide more precise motor control, thus increase the efficiency of the motor.

Figure 1:
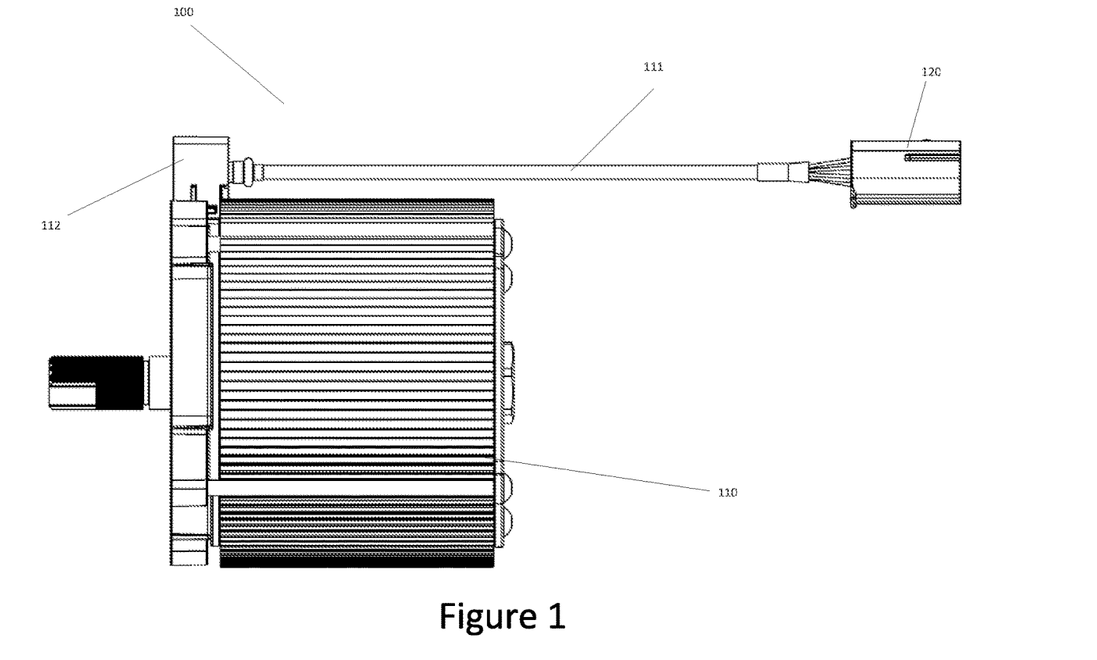
FIG. 1 shows a slotless motor with a rotor position sensing element assembly.

FIG. 1 shows a system 100 comprising a slotless motor 110 and rotor position sensing element assembly 111. The rotor position sensing element assembly comprises sensor connector 112 and connector plug 120 for connecting to a motor controller (not shown). The sensor connector 112 is configured to couple to the sensor ring in order to transfer the sensor signals to the motor controller via connector plug 120. This embodiment shows a wired connection between the sensor connector 112 and connector plug 120, however, it will be understood that the transfer of sensor data may be achieved through a wireless connection, for example, via Bluetooth™ or Wi-Fi™ where the sensor connector comprises a wireless module configured to communicate with a wireless module coupled to the sensor connector.

Figure 2:
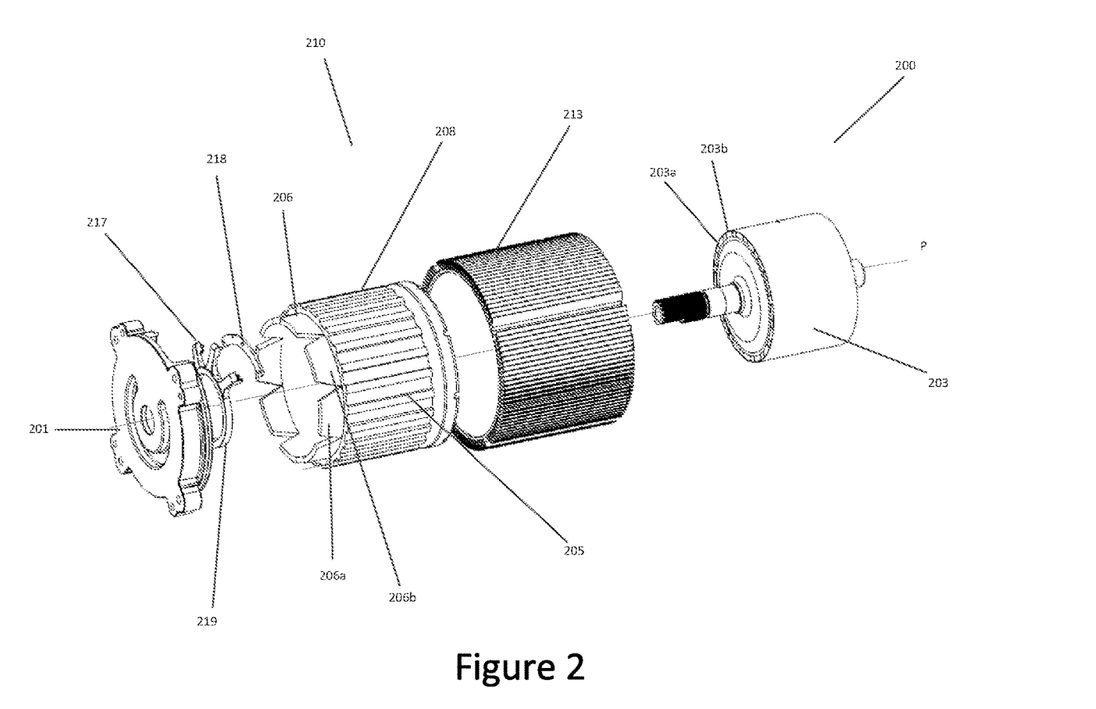
FIG. 2 shows an exploded view of an example of a slotless motor comprising a rotor position sensing element.

FIG. 2 shows an example of an exploded view of a slotless motor assembly 200 comprising a slotless motor 210 comprising a rotor position sensing element. FIG. 2 shows a slotless motor 210 comprising a heat sink motor housing 213, stator 205, a sensor ring attachment 217, sensor ring 219, sensor PCB 218 and motor housing end cap 201.

The stator 205 comprises a coil winding assembly 206 which has a plurality of coil windings arranged into distinct blocks 206a, 206b and further comprises a flux ring 208 that encompasses the coil winding assembly, all of which, in this example, is encompassed by a heat sink motor housing 213. Providing a heat sink on the motor housing aids in temperature regulation of the motor itself. It will also be appreciated that the addition of a flux ring increases the strength of the magnetic field generated when a current is passed through the coil windings.

Each of the distinct blocks 206a, 206b of the coil winding assembly 206 has a gap between the adjacent blocks 206a, 206b. The rotor 203 which is rotatable about a rotational axis P has permanent magnets 203a, 203b spaced about its circumference and is placed within the stator 205 and motor housing 213 such that it is completely encompassed by the stator 205. The rotational axis P extends through the centre of the entire motor assembly and in this example the plurality of distinct blocks 206a,206b are spaced about the axis P in an N-fold rotational symmetry where in N is the number of distinct blocks 206a,206b.

In this example, the sensor ring 219 together with sensor ring attachment 217 and sensor PCB 218 make up the rotor position sensing element. The sensor ring 219 comprises at least one sensor capable of sensing the magnetic field of the magnets 203a, 203b on the rotor 203. The sensor PCB 218 may provide basic circuitry to the sensor on the sensor ring 219 and provide a coupling point for the sensor connector 112. In some embodiments the sensor is any one of: a magnetic field sensor, for example a hall-effect based position sensor or a magnetostrictive position sensor, a potentiometric position sensor, an inductive position sensor, an eddy current-based position sensor, a capacitive position sensor, a fibre-optic position sensor, an optical position sensor and an ultrasonic position sensor. In some embodiments the sensor PCB 218 may be housed in the sensor connector 112 which is configured to couple to the sensor ring 219 and receive sensor readings. The sensor ring attachment 217 is configured to hold the rotor position sensor element relative to at least one of the distinct blocks such that the sensor is maintained in a predetermined location relative to the stator 205 and coil winding assembly 206. The sensor ring attachment 217 may have a tapering projection which may be configured to fit in a gap between the adjacent blocks 206a,206b. The rotor position sensing element is also coupled to motor end cap 201 such that the length of the motor is not increased by the addition of the rotor position sensing element. It will be appreciated that although three sensor ring attachments are shown, it is possible to hold the rotor position sensing element in a fixed position using one or a plurality of sensor ring attachments wherein each of the plurality of sensor ring attachments are configured to fit in a different gap between the adjacent blocks.

In normal functioning of the motor, a magnetic field will be generated in the stator which will cause the rotor to rotate about the rotational axis. The sensor on the sensor ring 219 measures the magnetic field produced by the magnets on the rotor 203. The characteristics of the magnetic field measurement provides detail on the current orientation of the rotor i.e. the polarity of the magnetic field, the field strength etc. Once the orientation of the rotor 203 is known it is possible to derive which phase and associated coils in the windings need to be energised to create a torque in the rotor 203 to cause it to rotate in the desired direction and at the desired speed. For example, in the case of a permanent magnet rotor, a permanent magnet on the rotor 203 having a north pole directed radially outward may generate a magnetic field in the region of the sensor, the magnetic field having a certain polarity, in this example north, and a strength dependent on the spacing between the magnet and the sensor and the strength of the magnet. This north pole may be the closest magnet to the sensor which may relay the information to a motor controller. Although the working example has been described in the context of a permanent magnet rotor, it would be understood by the skilled person that other versions of rotor may also be used with the use of an appropriate sensor.

As the orientation of the sensor ring 219 comprising the sensor is fixed relative to the stator 205, in this example via the coil winding assembly 206 and sensor ring attachments, the motor control system is able to determine the rotor 203 position and orientation relative to the stator. It can then provide current to energise the appropriate coil winding(s) 206 at the appropriate polarity in order to generate a torque in the rotor 203 to cause it to rotate.

Figure 3A:
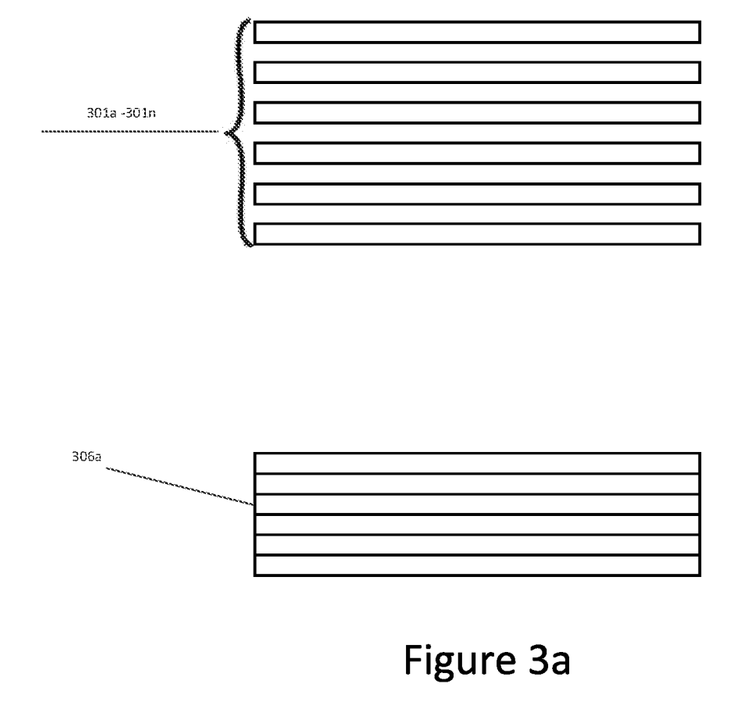
FIG. 3a shows exemplary individual coil windings wires forming a block of coil windings for a slotless motor.
Figure 3B:
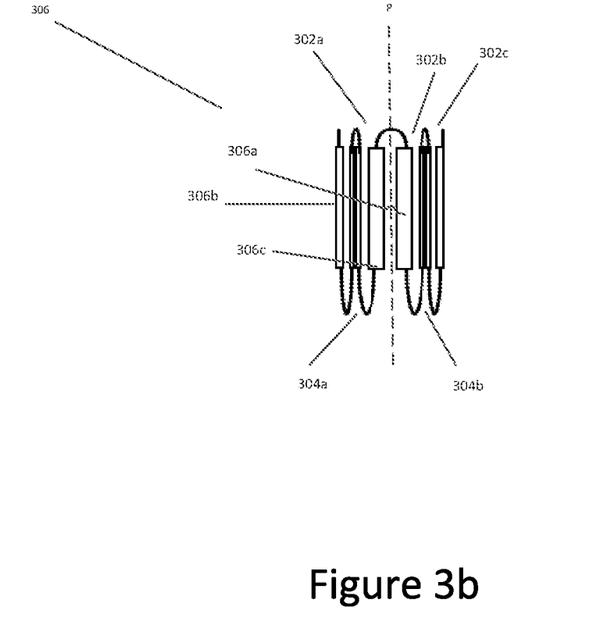
FIG. 3b shows exemplary coil windings for a slotless motor.

FIG. 3a and FIG. 3b show an example of coil windings in a slotless motor. The individual coil wires 301a-301n are coupled together to form blocks of coil windings 302 around the rotational axis P of the motor forming the coil assembly with a first axial end and a second axial end. The way in which the blocks 302a, 302b, 303c are wound produces a gap between adjacent blocks at the first axial end 302a, 302b, 302c and second axial end 304a, 304b of the coil windings. In some embodiments the coil windings comprise a positive integer X phase wherein each block 306a, 306b, 306c comprises a different phase. In some embodiments each distinct block 306a, 306b, 306c may include a positive integer number X of phases of coil windings. In preferred embodiments each block 306a, 306b, 306c comprises three phases of coil windings. That is to say that each individual coil wire 301a-301n is configured to carry current at one of the phases. In some embodiments each individual coil wire is configured to carry current at a different phase to an adjacent coil wire. In either case the individual coils are wound in a first direction towards the first axial end 302 forming a block and then wound in a second direction towards the second axial end 304 forming a block. This allows each coil in the same phase to be in series.

As each coil wire becomes energised is a magnetic field is created and the angular position of largest flux magnitude for each winding is spaced apart from angular positions of largest flux magnitude of adjacent windings is given by an angle of $\pi/NX$ radians, where N is the number of distinct blocks and X is the number of phases in a block. A sensor measurement at, or close to these points, would be indicative of the maximum torque that can be generated at a given rotor position and orientation. This is because the point of largest flux magnitude is the point that the magnetic field is at the strongest which will create the largest torque on the rotor, for example in the case of a permanent magnet rotor, to force the appropriate magnet pole in alignment with the generated magnetic field of the coils. This would also apply to a reluctance motor whereby the flux barriers on the rotor for a reluctance motor would force the rotor to be aligned with the magnetic field lines generated by the coils.

In the embodiment shown in FIG. 3a and FIG. 3b each block comprises a repeated winding pattern such that each phase winding is wound in a first direction and consecutively wound in a second direction opposite to the first direction. Each block would therefore have an X phase pattern in a first direction of induced magnetic field followed by an X phase pattern in a second direction of induced magnetic field opposite to the first i.e. ($A_\uparrow$, $B_\uparrow$, $C_\uparrow$, $A_\downarrow$, $B_\downarrow$, $C_\downarrow$), wherein the arrows represent the direction of the induced magnetic field. The N number of distinct blocks have an N-fold rotational symmetry about the rotational axis P such that equivalent locations in each block are spaced apart by $2\pi/N$ radians. In other words, each block has an identical configuration evenly spaced about the rotational axis such that, from any given starting point rotations of an angle calculated as any positive integer multiplied by $2\pi/N$ radians results in an equivalent coil location.

Figure 4A:
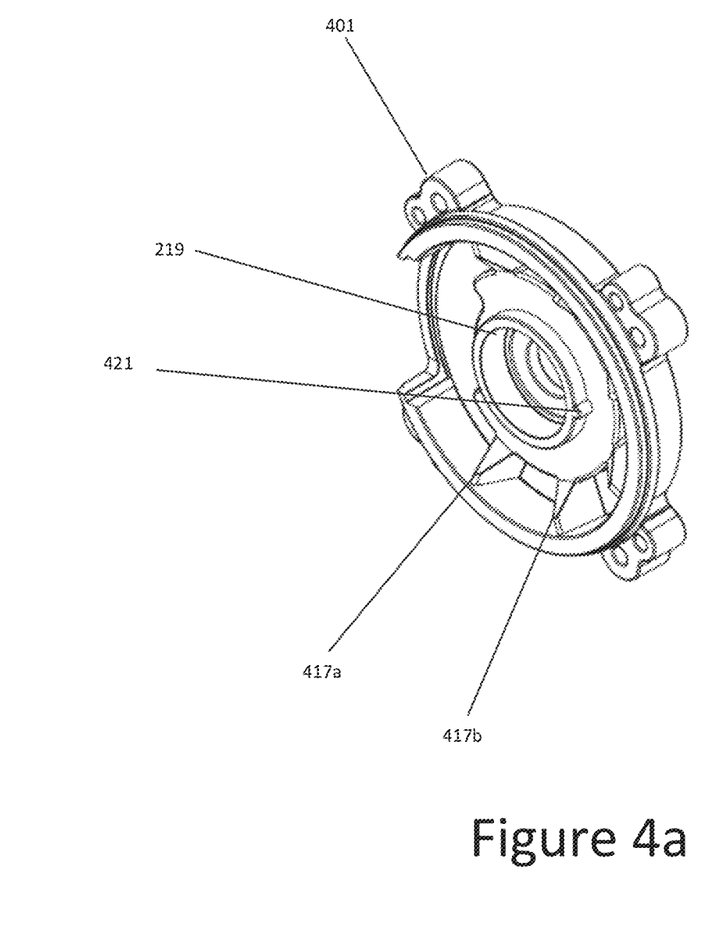
FIG. 4a shows a perspective view of a sensor ring and sensor ring attachment coupled to a motor end cap.
Figure 4B:
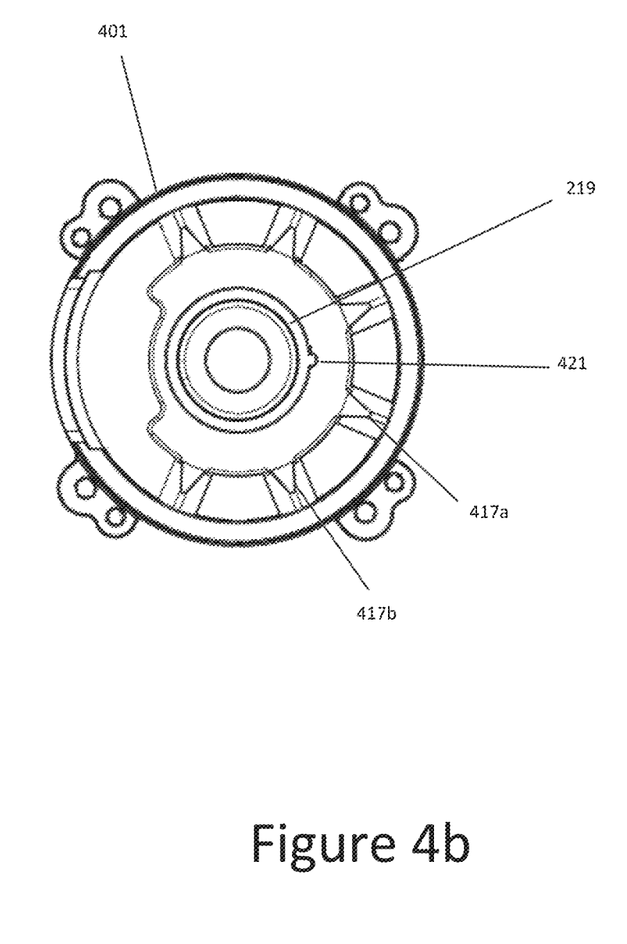
FIG. 4b shows a front on view of a sensor ring and sensor ring attachments coupled to a motor end cap.

FIG. 4a and FIG. 4b show a perspective and frontal views of an example of a motor housing end cap 401 comprising a rotor position sensing element. In this example, the end cap 401 and sensor ring attachments 417a, 417b are integrally formed. the sensor ring 219 may comprise nodule 421 which is configured to couple to a hole of corresponding shape and size on the end cap such that the sensor ring 219 is coupled to the end cap in a predetermined manner. In some embodiments, the sensor ring attachments 417a, 417b and/or sensor ring 219 may be milled or casted with the motor end cap 401. In some embodiments, the sensor ring attachments 417a, 417b and/or sensor ring 219 may be coupled to the motor end cap 401 via welding, gluing or some other means of fusing the two components together.

Because the rotor position sensing element is couplable (or coupled) to the motor end cap 401 the rotor position sensing element may be held in a fixed position relative to the motor housing 213. The rotor position sensing element can therefore be held fixed relative to the coil windings of the stator wherein the rotor position elements are tapered so as to fit in between the gap between two adjacent coil winding blocks 306a, 306b. In some embodiments the shape of the sensor ring attachments 417a, 417b are designed to fit between the gaps between adjacent coil winding blocks 306a, 306b. By holding the rotor position element fixed relative to the stator the sensors can be placed at predetermined locations relative to a particular phase of a coil winding or block of coil windings. The rotor position readings provided to the motor controller thereby show the position of the rotor relative to the stator. In other words, the rotor position sensor element is held relative to at least one, and in some cases all of the coil windings of the stator, the axis of rotation of the rotor and the motor casing in general. Advantageously, any measurements made by the rotor position sensing elements may be completed with an increased level of precision and accuracy as the readings have reduced interference from dimension tolerances of the components of the motor assembly components.

In the context of the present disclosure other examples and variations of the systems described herein will be apparent to a person of skill in the art. It will be appreciated from the discussion above that the embodiments shown in the Figures are merely exemplary, and include features which may be generalised, removed or replaced as described herein and as set out in the claims.

The invention claimed is:

1. A slotless motor comprising:
   a flux ring;
   a rotor having a rotational axis;
   a plurality of coil windings arranged into an integer N number of distinct blocks, each block being arranged about the rotational axis and having a gap between each adjacent pair of blocks; and
   a rotor position sensing element comprising:
   a sensor ring having a plurality of sensors fixed to the sensor ring; and
   a sensor ring attachment extending from the sensor ring;
   wherein the plurality of sensors are spaced around the rotational axis; and
   wherein the rotor position sensing element is configured to hold the sensor ring relative to at least one of the blocks such that the plurality of sensors is held in a predetermined position; wherein
   the sensor ring attachment is formed as a tapering projection, and wherein the tapering projection is shaped to match the shape of the gap.

2. The motor of claim 1, wherein the sensor ring attachment couples the sensor ring to one of the gaps between adjacent blocks.

3. The motor of claim 1, further comprising a motor housing, wherein the housing holds the coil windings in a fixed location relative to the housing.

4. The motor of claim 3, wherein the sensor ring is integrally formed with the motor housing.

5. The motor of claim 3, wherein the motor housing is made of a metal.

6. The motor of claim 3, wherein the sensor ring is coupled to the motor housing.

7. The motor of claim 1, wherein each of the plurality of sensors is any one of: a magnetic field sensor, a potentiometric position sensor, an inductive position sensor, an eddy current-based position sensor, a capacitive position sensor, a fibre-optic position sensor, an optical position sensor and an ultrasonic position sensor.

8. The motor of claim 1, wherein the plurality of sensors is angularly spaced apart around the rotational axis based on one or more of the number(s) of distinct blocks and/or a number of phases of the coil windings.

9. The motor of claim 1, wherein the sensor ring and the sensor ring attachment are integrally formed.

10. The motor of claim 1, wherein each block includes a positive integer number X of phases of coil windings, and wherein an angular position of largest flux magnitude for each winding is spaced apart from angular positions of largest flux magnitude of adjacent windings by an angle of $\pi/NX$ radians.

11. The motor of claim 10, wherein each sensor included in the plurality of sensors is spaced apart from each other sensor by an angle in radians of:

$$n\left(\frac{2\pi}{N}\right) + m\left(\frac{2\pi}{N \cdot X}\right)$$

wherein n is any integer and m is any integer except 0 or pX and in which p is any integer.

12. The motor of claim 10, wherein each sensor included in the plurality of sensors being spaced apart from each other sensor by an angle in radians of:

$$n\left(\frac{2\pi}{N}\right) + m\left(\frac{\pi}{N \cdot X}\right)$$

wherein n is any integer and m is any integer except 0 or 2pX and in which p is any integer.

13. The motor of claim 1, wherein the N number of distinct blocks have an N-fold rotational symmetry about the rotational axis such that equivalent locations in each block are spaced apart by $2\pi/N$ radians.

14. The motor of claim 1, wherein the sensor ring attachment is configured to couple to the gap between adjacent blocks, and wherein an end of the sensor ring attachment is configured to be held in the gap between adjacent blocks.

15. The motor of claim 1, comprising a plurality of sensor ring attachments each configured to couple to a different gap between adjacent blocks.

16. The motor of claim 1, wherein at least one of the plurality of sensors is held in a fixed position relative to the sensor ring attachment.

* * * * *